(12) United States Patent
McLain et al.

(10) Patent No.: US 11,985,117 B2
(45) Date of Patent: May 14, 2024

(54) SYSTEM AND METHOD FOR SINGLE SIGN ON ACROSS MULTIPLE APPLICATIONS WITH LICENSE ENABLEMENT

(71) Applicant: Toshiba TEC Kabushiki Kaisha, Shinagawa-ku (JP)

(72) Inventors: Peter McLain, Portland, OR (US); Christopher Nguyen, Huntington Beach, CA (US); Louis Ormond, Irvine, CA (US); Marianne Kodimer Kodimer, Huntington Beach, CA (US); Chang Park, Lake Forest, CA (US); Silvy Wilson, Rancho Santa Margarita, CA (US)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 271 days.

(21) Appl. No.: 17/677,715

(22) Filed: Feb. 22, 2022

(65) Prior Publication Data

US 2023/0269244 A1 Aug. 24, 2023

(51) Int. Cl.
*H04L 9/40* (2022.01)
*H04L 67/141* (2022.01)

(52) U.S. Cl.
CPC ...... *H04L 63/0815* (2013.01); *H04L 63/0807* (2013.01); *H04L 63/102* (2013.01); *H04L 63/105* (2013.01); *H04L 67/141* (2013.01)

(58) Field of Classification Search
CPC ............ H04L 63/0815; H04L 63/0807; H04L 63/102; H04L 63/105; H04L 67/141
See application file for complete search history.

(56) References Cited

U.S. PATENT DOCUMENTS

2015/0301773 A1* 10/2015 Minagawa ................ G06F 3/12
358/1.13
2020/0220985 A1* 7/2020 Keery ................ H04N 1/00949

* cited by examiner

*Primary Examiner* — Huan V Doan
(74) *Attorney, Agent, or Firm* — UB Greensfelder LLP; John X. Garred

(57) ABSTRACT

A multifunction peripheral (MFP) includes user selectable functions that call home applications on the device that direct it to work cooperatively with cloud service providers. To avoid requiring users to login to each cloud service each time they use it, they are registered with an authorization server to establish and grant identity and authorization tokens. When a user logs in to an MFP, they are redirected to login to the authorization server which then sends tokens to the MFP identifying the user and their permissions and licenses. Home applications associated by the tokens are displayed for selection. Each time a home application using a cloud service is selected, a background application sends the user's session tokens with a service request to an associated cloud service resource server. The resource servers processes authenticated requests and return the result to the MFP which completes the selected home application function. Therefore, the user is able to use multiple cloud services without need to login to them.

20 Claims, 6 Drawing Sheets

SYSTEM AND METHOD FOR SINGLE SIGN ON ACROSS MULTIPLE APPLICATIONS WITH LICENSE ENABLEMENT

TECHNICAL FIELD OF THE INVENTION

This application relates generally to document processing operations completed in conjunction with a multifunction peripheral and one or more cloud services. The application relates more particularly to a single sign-on framework across multiple independent applications with license enablement.

BACKGROUND OF THE INVENTION

Document processing devices include printers, copiers, scanners and e-mail gateways. More recently, devices employing two or more of these functions are found in office environments. These devices are referred to as multifunction peripherals (MFPs) or multifunction devices (MFDs). As used herein, MFPs are understood to comprise printers, alone or in combination with other of the afore-noted functions. It is further understood that any suitable document processing device can be used.

BRIEF DESCRIPTION OF THE DRAWINGS

Various embodiments will become better understood with regard to the following description, appended claims and accompanying drawings wherein:

DETAILED DESCRIPTION OF THE INVENTION

Figure 1:
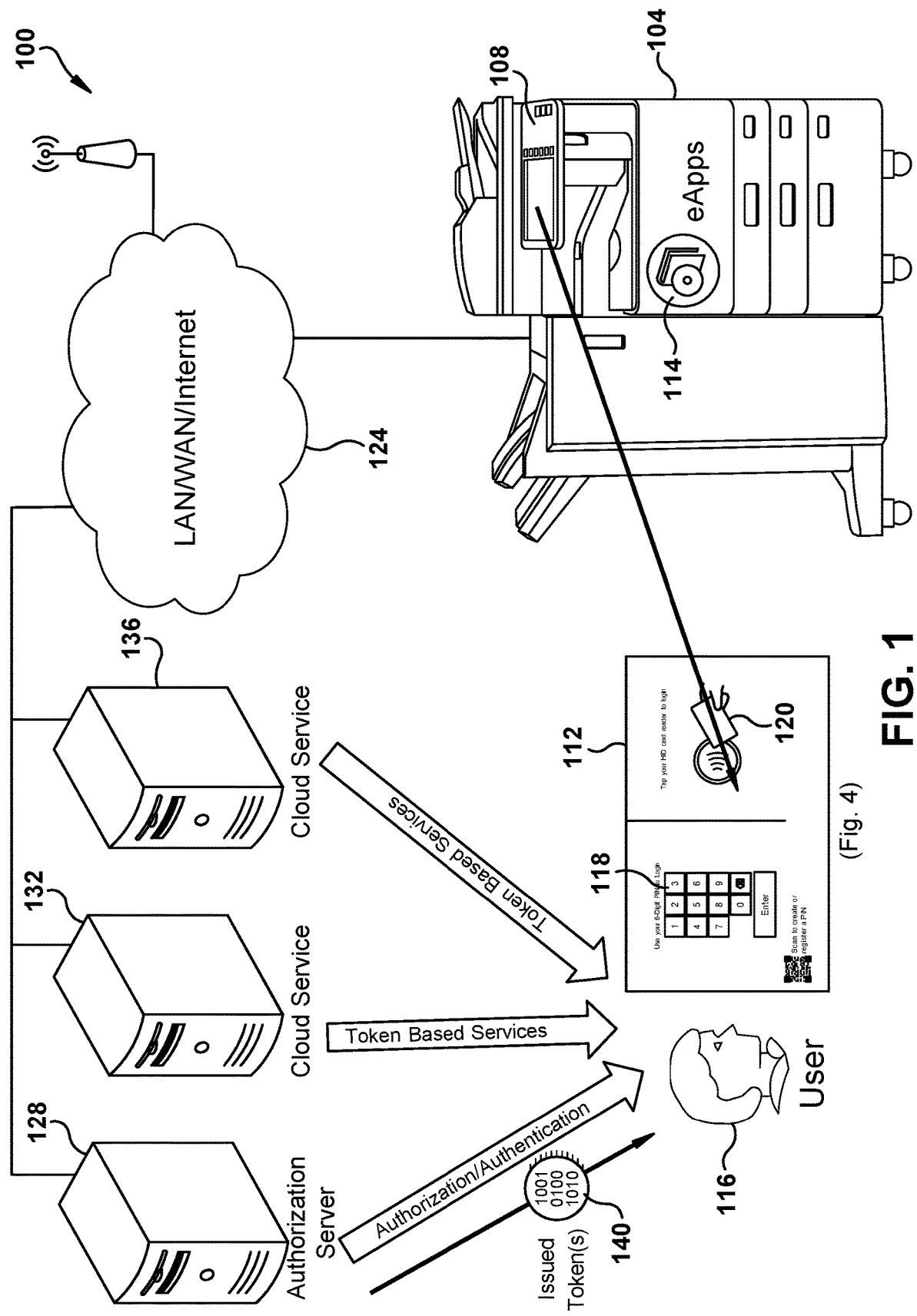
FIG. 1 an example embodiment of a system for single sign-on across multiple applications with license enablement.

The systems and methods disclosed herein are described in detail by way of examples and with reference to the figures. It will be appreciated that modifications to disclosed and described examples, arrangements, configurations, components, elements, apparatuses, devices methods, systems, etc. can suitably be made and may be desired for a specific application. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such.

Modern MFPs can function in conjunction with cloud services. Cloud services may include services such as document storage applications, contact storage, email services or encryption services. Cloud services can be integrated with MFP functions via an associated application, referred to herein as eApps. By way of example, a user may wish to print from their cloud storage service. Invoking an associated eApp will open a session to the cloud server, retrieve one or more documents and print them with MFP hardware. By way of further example, an eApp may be invoked to scan documents directly to cloud storage.

An MFP walk up user can launch multiple cloud service applications. The user is required to authenticate against the service provider each and every time the associated eApp is launched. This can be burdensome, time consuming and frustrating for users. This follows a typical requirement for an initial login to the MFP itself.

Example embodiments herein include three architectural components. An authorization server is used to grant authorization and authentication tokens to a user. Cloud service providers grant services to users based on the tokens. eApps engage and interact with the authorization server and cloud service providers. The authorization server provides an authentication service between the eApps and the cloud service providers. A cloud service user registers with the authorization server to establish an identity and/or authorization token. The identity token is then mapped to the registered user.

Example embodiments herein implemented with embedded background applications and home applications. One background application provides an authentication request between a walk-up user and the authorization server. The background application is comprised of a persistent service that caches identity/authorization tokens on behalf of the home applications. Home applications provide users access to cloud service providers' features. Home applications are relatively short lived processes as compared to a user's MFP session and the duration of a background application. Once access to a home application is obtained, a user can use MFP functions, such as a print or scan function, with the provider's features such as to release a print from the cloud storage, scan to an email using a provider's contact list. Once a user is authorized, a session is established at the MFP and the user is not required to authenticate again when using a different, licensed home application.

Licensing is managed by the authorization server which returns a token responsive to a request from the MFP. If the user tries to use an unlicensed home application, they are notified to contact an authorized representative to get a license. A license is suitably implemented by inputting an authorization code to the authorization server.

The afore-noted example provides a single sign-on framework which allows a user to authenticate one time and have the ability to launch various cloud applications without authenticating again. Various cloud applications can thus be established during a session by use of licensing facilitated by a session token provided by the Authorization Server. Home applications suitably auto-detect MFPs capabilities for additional print features such as finishing, hole punching, stapling, folding or eco-printing.

FIG. 1 illustrates an example embodiment of a system 100 for single sign-on across multiple applications with license enablement. MFP 104 includes a user interface 108, suitably comprised of a touchscreen display. MFP 104 is populated with one or more eApps 114. User interface 108 displays a logon screen 112 facilitating a login by user 116 by any suitable means, such as PIN entry on touchpad 118 or card key tap 120. Included in FIG. 1 is network cloud 124, suitably comprised of a local area network (LAN), a wide area network (WAN), which may comprise the Internet, or any suitable combination thereof. Network cloud 124 is comprised of any suitable wireless or wired data connection or combination thereof.

Network cloud 124 is also connected to authorization server 128, and one or more cloud service severs such as servers 132 and 136. User 116 is pre-registered with authorization server 128. Such registration associates the user with licenses for accessing one or more cloud services. After the user logs in to MFP 104, the MFP contacts the authorization server 128 which generates a token 140 identifying eApps licenses available to user 116. The token is sent to MFP 104 via network cloud 124. As will be detailed further below. The token dictates which eApps are usable by user 116, and thus what cloud services are available.

Figure 2:
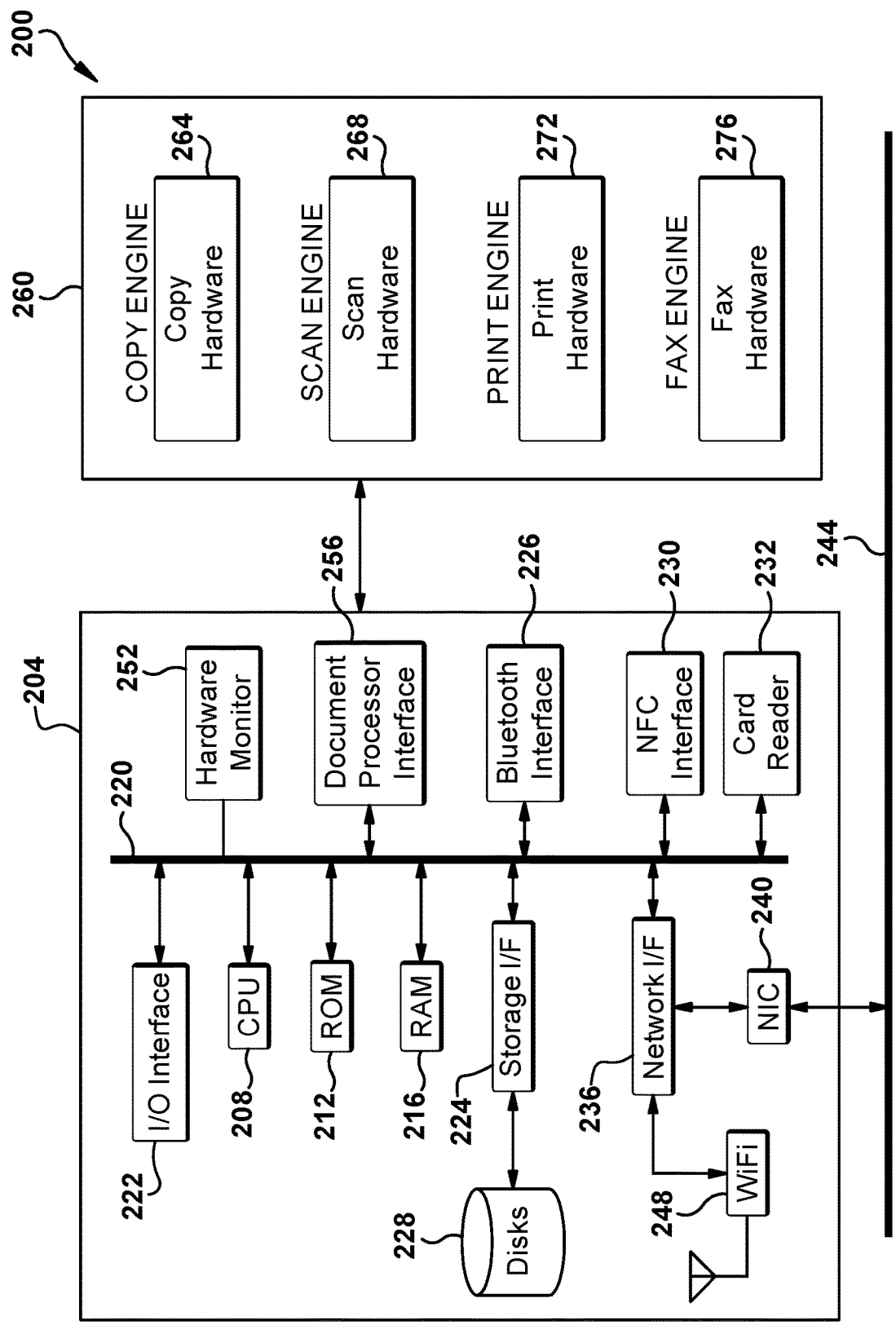
FIG. 2 is an example embodiment of a networked digital device, such as multifunction peripheral.

Turning now to FIG. 2, illustrated is an example embodiment of a networked digital device comprised of document rendering system 200 suitably comprised within an MFP, such as with MFP 104 of FIG. 1. It will be appreciated that an MFP includes an intelligent controller 204 which is itself a computer system. Thus, an MFP can itself function as a server with the capabilities described herein. Included in intelligent controller 204 are one or more processors, such as that illustrated by processor (CPU) 208. Each processor is suitably associated with non-volatile memory, such as read-only memory (ROM) 212, and random access memory (RAM) 216, via a data bus 220.

Processor 208 is also in data communication with input/output interface 222, suitably comprising a user touchscreen. While touchscreens are discussed in example embodiments herein, it is to be appreciated that any suitable user interface, such as keyboards, switches, displays, trackballs or mice may be used.

Processor 208 is also in data communication with a storage interface 224 for reading or writing to a storage 228, suitably comprised of a hard disk, optical disk, solid-state disk, cloud-based storage, or any other suitable data storage as will be appreciated by one of ordinary skill in the art.

Processor 208 is also in data communication with additional interfaces, such as Bluetooth interface 226, NFC interface 230 and card reader 232 for data exchange with proximity cards, such as card keys.

Processor 208 is also in data communication with a network interface 236 which provides an interface to a network interface controller (NIC) 240, which in turn provides a data path to any suitable wired interface or physical network connection 244, or to a wireless data connection via wireless network interface 248. Example wireless data connections include cellular, Wi-Fi, wireless universal serial bus (wireless USB), satellite, and the like. Example wired interfaces include Ethernet, USB, IEEE 1394 (FireWire), Lightning, telephone line, or the like.

Processor 208 can also be in data communication with any suitable user input/output (I/O) network interface 248 which provides data communication for interfacing with user peripherals, such as displays, keyboards, mice, track balls, touch screens, or the like. Processor 208 can also be in communication with hardware monitor 252, such as a page counter, temperature sensor, toner or ink level sensor, paper level sensor, or the like.

Also in data communication with data bus 220 is a document processor interface 256 suitable for data communication with the document rendering system 260, including MFP functional units. In the illustrated example, these units include a scan engine comprising copy hardware 264, a scan engine comprise of scan hardware 268, a print engine comprised of print hardware 272 and a fax engine comprised of fax hardware 276 which together comprise MFP document rendering system 260. It will be understood that functional units are suitably comprised of intelligent units, including any suitable hardware or software platform.

Figure 3:
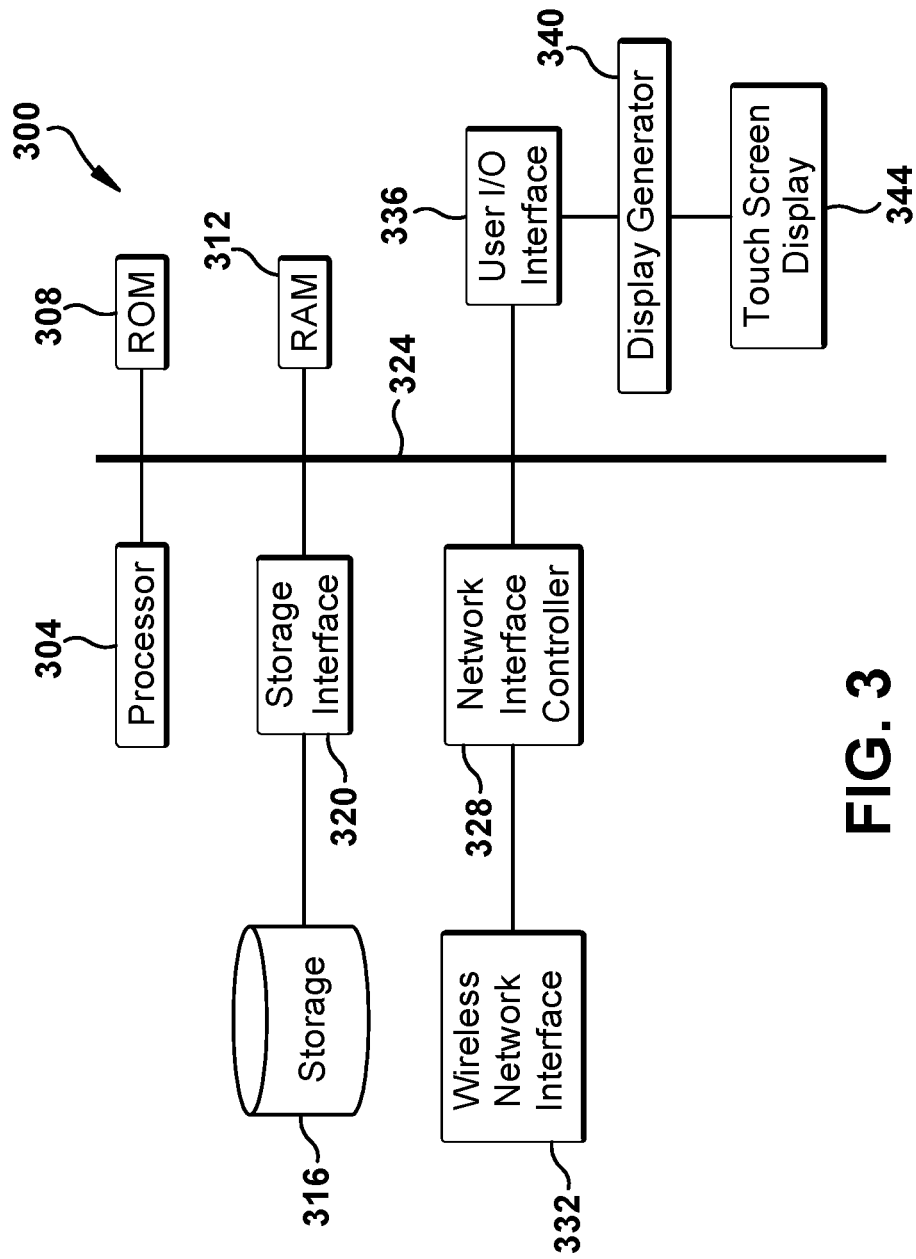
FIG. 3 is an example embodiment of a digital device system.

Turning now to FIG. 3, illustrated is an example embodiment of a digital data processing device 300 such as servers 128, 132 and 136 of FIG. 1. It is to be appreciated that some components listed may be unnecessary in certain configurations. Components of the digital data processing device 300 suitably include one or more processors, illustrated by processor 304, memory, suitably comprised of read-only memory 308 and random access memory 312, and bulk or other non-volatile storage 316, suitably connected via a storage interface 320. Data communication among components is accomplished via data bus 324. A network interface controller 328 suitably provides a gateway for data communication with other devices, via any wireless or wired connection, such as via wireless network interface 332. A user input/output interface 336 is suitably comprised of display generator 340 interfacing with touchscreen display 344. As noted above, any suitable user input and display can be used.

Figure 4:
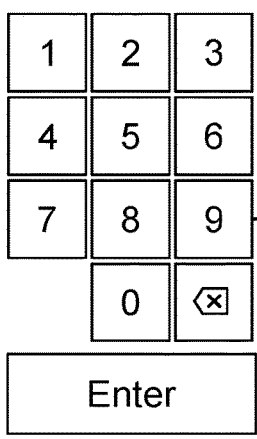
FIG. 4 is an example embodiment of a multifunction peripheral login screen.
Figure 4:
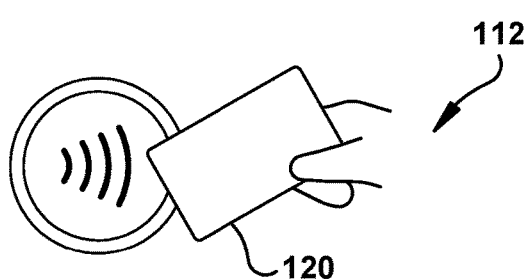

FIG. 4 is an exploded view of login screen 112 of FIG. 1 showing touchpad 118 for a character based login, such as with PIN entry on touchpad 118. Also shown is card key tap 120, such as with use of any suitable proximity card key.

Figure 5:
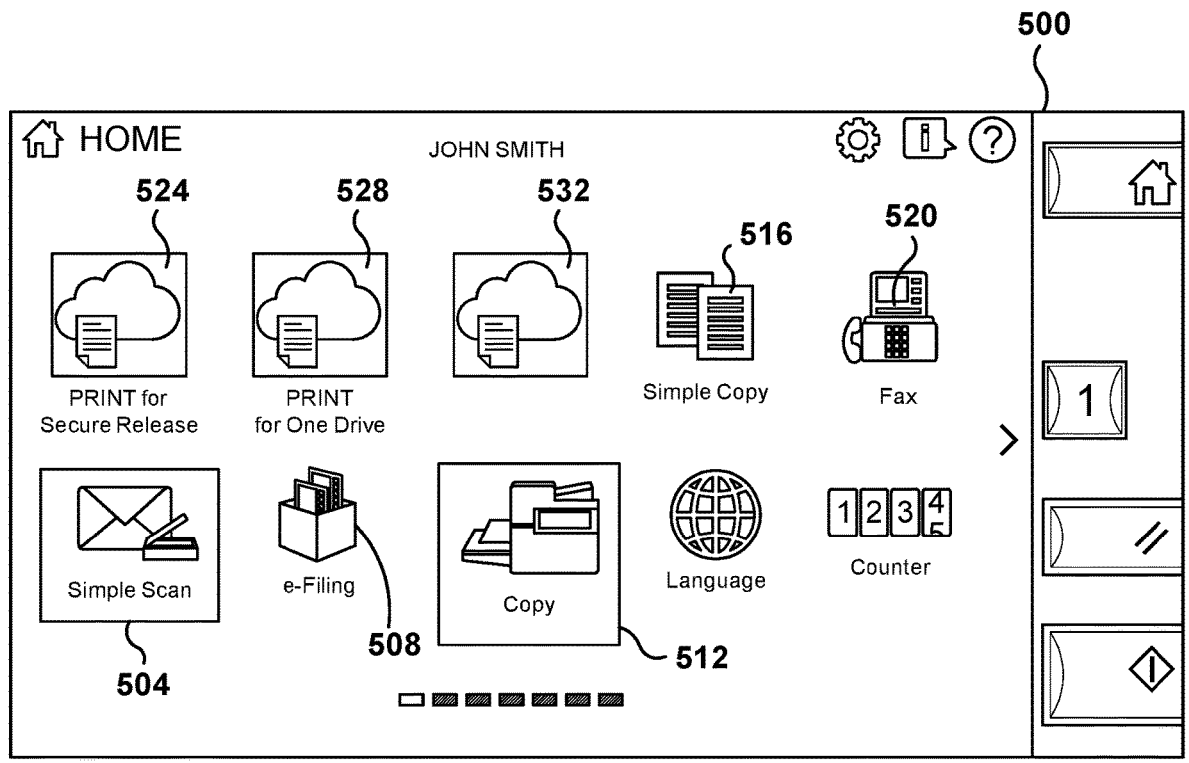
FIG. 5 is an example embodiment of multifunction peripheral user interface screen for receiving document processing commands.

FIG. 5 illustrates an example embodiment of a user interface screen on MFP 104 of FIG. 1 wherein a logged-in user can input document processing commands, such as scanning by selecting button 504, e-filing by selecting button 508 and copying by selecting button 512, simple copying by selecting button 516 and faxing by selecting button 520. Selection buttons for eApps include button 524 to print for secure release, button 528 for print to One Drive and button 532 to print to Google drive. It is thus to be understood that eApp buttons commence MFP operations cooperatively with MFP functions and cloud services.

Figure 6:
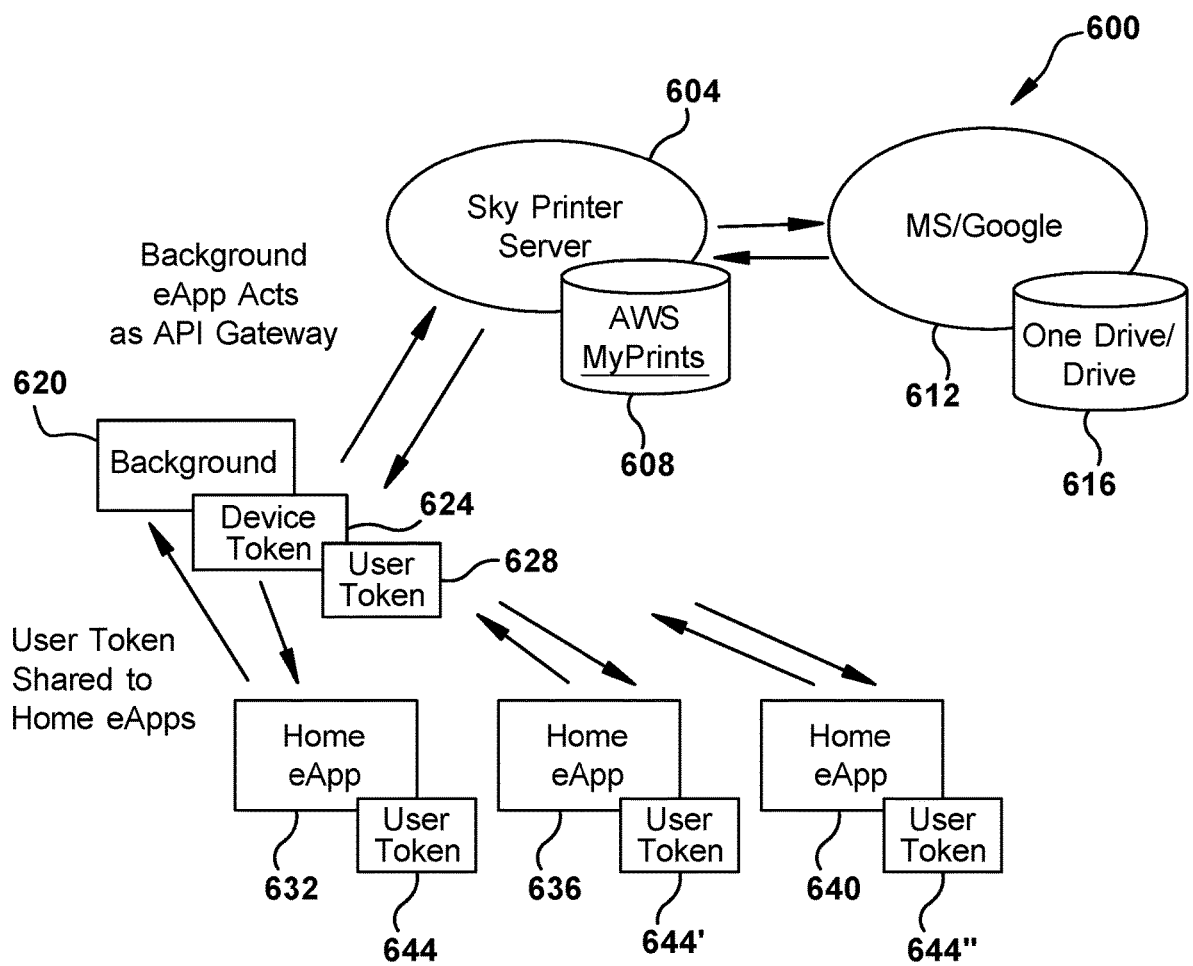
FIG. 6 is an example embodiment of system for single sign-on across multiple applications with license enablement.

FIG. 6 illustrates a system diagram 600 for single sign-on across multiple applications with license enablement. Examples of present day cloud services are illustrated, including SkyPrinter service 604, Amazon Work Space (AWS) service 608, Microsoft and Google services 612 providing One Drive and Drive services 616, respectively. These web services are selected to be illustrative, and it is to be understood that any suitable web service may be implemented. An associated MFP includes a background application 620 that obtains tokens, such as device token 624 and user token 628 obtained from an authorization server. The MFP also houses eApps 632, 636 and 640, access to which is accomplished by user token 644, shown associated with eApp 632, with eApp 636 at 644' and with eApp 640 at 644".

Figure 7:
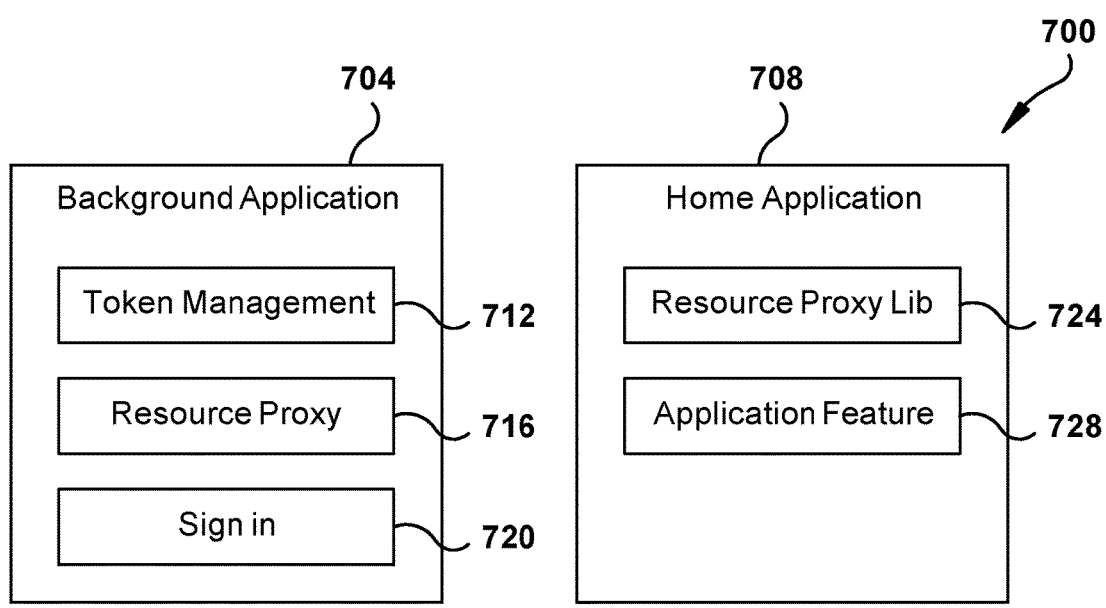
FIG. 7 is an example embodiment of a software block diagram for a system for single sign-on across multiple applications with license enablement.

FIG. 7 is a software block diagram 700 for a system for single sign-on across multiple applications with license enablement. Included is background application 704 and one or more home applications, illustrated by home application 708. Background application 704 includes token management module 712 that functions for token management and secure token storage. Token management module 712 also functions to parse token permissions to implement licensing restrictions on which Home Applications a user is permitted to invoke. Token management module 712 also functions for access delegation to grant servers access to information, suitably implemented via Open Authorization (OAuth).

Background application 704 further includes resource proxy module 716 which functions to pass tokens to a resource server, such as an authorization server, pass results back to a caller and handle errors. Sign in module 720 functions to display initial user affordance to initiate login, redirect to configures an authorization server, interpret results from the authorization server and coordinate new user sessions with MFP firmware.

Home application 708 includes resource proxy library 724 which functions to call background applications resource proxy 716 of background application 704 when resource server services are needed. Home application 708 also includes application feature module 728 which functions to unique MFP user services. Different home applications comprise eApps which have unique functions, such completing an email scan to an mail resource, list print jobs from a document server, list print jobs from a network print queue, copy documents or archive to web storage.

Figure 8:
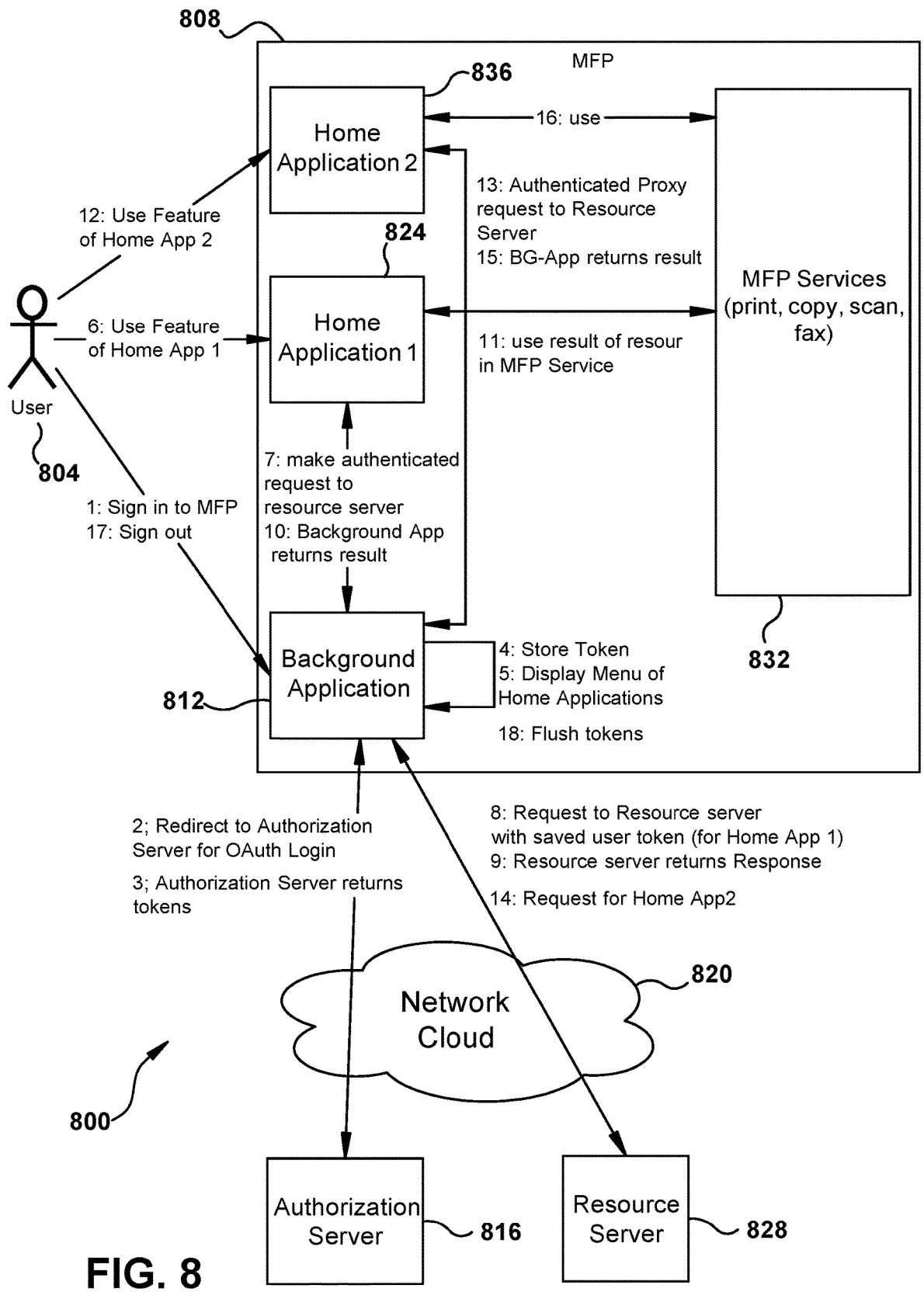
FIG. 8 is an example embodiment of a flow diagram for a system for single sign-on across multiple applications with license enablement.

FIG. 8 is a flow diagram 800 for a system for single sign-on across multiple applications with license enablement. The process commences when user 804 logs in to MFP 808. After login, background application 812 redirects login information to authorization server 816 via network cloud 820. The authorization server checks credentials and issues user session tokens. Authorization serer 816 sends the tokens to background application 812 which stores them and activates and deactivates home applications, based on user token permissions/licensing fields. Tokens are suitably a signed JSON Web Token (JWT) which allows the background applications to parse the permissions. The user is now logged into the MFP and the background application displays available MFP home applications and other available services to user 804. User 804 then selects home application 824 which, by way of example, may be an instruction to release a print job from a cloud queue service. Home application 824 makes a proxy request to background application 812 for a service from a resource server. Background application 812 retrieves the user's session token and sends the token with the request to resource server 828. Resource server 828 processes an authenticated request returns the result to background application 812, which in the example may be a list of cloud print jobs. Background application 812 returns the resultant resource from resource server to home application 824. Next, home application 824 uses MFP resources 832 to complement the resource form resource server 828 with functions such as printing.

In the same session, user 804 selects home application 836, for example and instruction to email a scanned document, without logging in. Home application 836 invokes background application 812 which generates an authenticated proxy request to resource server 828 after retrieving the user's session tokens. Server 828 responds with the requested result to home application 836 via background application 812. That resource is then complemented with MFP resources 832, such as scanning. User 804 is finished with their session and signs out of background application 812, which then terminates the user session and erases the user session tokens.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the spirit and scope of the inventions.

What is claimed is:

1. A system comprising:
a processor and associated memory;
a network interface;
a document processing engine;
a user interface including a user input and a display;
the processor configured to receive login information from an associated user via the user interface;
the processor further configured to request token data corresponding to the login information received from an associated authorization server via the network interface;
the processor is further configure to receive token data corresponding to the request from the associated authorization server via the network interface;
the processor further configured to receive a document processing instruction from a user via the user interface, the document processing instruction including an instruction for operation of the document processing engine in conjunction with a cloud service;
the processor further configured to establish a cloud service session corresponding to a received document processing instruction with the cloud service in accordance with the token data; and
the processor further configured to execute the document processing instruction via the document processing engine and an established session with the cloud service.

2. The system of claim 1 wherein the processor is further configured to establish the cloud service session when the token data indicates that the user is licensed to perform the document processing instruction.

3. The system of claim 2 wherein the processor is further configured to:
receive a new document processing instruction from the user, the new document processing instruction including a new instruction for operation of the document processing engine in conjunction with a new cloud service;
establish a new cloud service session corresponding to a received new document processing instruction when the token data indicates that the user is licensed to perform the new document processing instruction; and
execute the new document processing instruction via the document processing engine and an newly established session with the new cloud service.

4. The system of claim 3 wherein the processor is further configured to initiate a license acquisition transaction by the user when the token data indicates that the user is not licensed to perform the document processing instruction or the new document processing instruction.

5. The system of claim 4 wherein the processor is further configured to request new token data for the user, wherein the new token data indicates that the user is now licensed to perform the document processing instruction or the new document processing instruction.

6. The system of claim 4 wherein the document processing engine includes a scan engine and a print engine, and wherein document processing instructions include one or more of scan to cloud storage, print from cloud storage, scan to email or scan to fax.

7. The system of claim 6 wherein the token data comprises data corresponding to cloud services that are registered with the associated authorization server.

8. A method comprising:
   receiving login information from a user via a user interface;
   requesting token data corresponding to received login information from an associated authorization server via a network interface;
   receiving token data corresponding to the request from the associated authorization server via the network interface;
   receiving a document processing instruction from the user via the user interface, the document processing instruction including an instruction for operation of a document processing engine in conjunction with a cloud service;
   establishing a cloud service session corresponding to a received document processing instruction with the cloud service in accordance with the token data; and
   executing the document processing instruction via the document processing engine and an established session with the cloud service.

9. The method of claim 8 further comprising establishing the cloud service session when the token data indicates that the user is licensed to perform the document processing instruction.

10. The method of claim 9 further comprising:
    receiving a new document processing instruction from the user, the new document processing instruction including a new instruction for operation of the document processing engine in conjunction with a new cloud service;
    establishing a new cloud service session corresponding to a received new document processing instruction when the token data indicates that the user is licensed to perform the new document processing instruction; and
    executing the new document processing instruction via the document processing engine and an newly established session with the new cloud service.

11. The method of claim 10 further comprising initiating a license acquisition transaction by the user when the token data indicates that the user is not licensed to perform the document processing instruction or the new document processing instruction.

12. The method of claim 11 further comprising requesting new token data for the user, wherein new token data indicates that the user is now licensed to perform the document processing instruction or the new document processing instruction.

13. The method of claim 11 wherein the document processing instruction includes one or more of scanning to cloud storage, printing from cloud storage, scanning to email or scanning to fax.

14. The method of claim 13 wherein the token data comprises data corresponding to cloud services that are registered with the associated authorization server.

15. A method comprising:
    storing a plurality of home applications in memory of a multifunction peripheral wherein each home application is associated with a corresponding resource server;
    registering a user with an authorization server wherein registration includes storing licensing information indicative of home applications available for use by the user;
    receiving login information from the user at a user interface of the multifunction peripheral;
    sending a token request from the multifunction peripheral to the authorization server for a token associated with the user;
    generating a token in accordance with the licensing information via the authorization server;
    sending a generated token from the authorization server to the multifunction peripheral;
    receiving a request from the user to run one of the plurality of home applications;
    selectively enabling the requested home application in accordance with the token;
    opening a session between the requested home application and its associated resource server when the requested home application is enabled; and
    completing a document processing operation with the multifunction peripheral and the resource server associated with the requested home application via the requested home application.

16. The method of claim 15 further comprising:
    receiving a new request from the user to run a new home application;
    selectively enabling a newly requested home application in accordance with the token;
    opening a session between the newly requested home application and the associated resource server when the newly requested home application is enabled; and
    completing the document processing operation with the multifunction peripheral and the resource server associated with the newly requested home application via the requested home application.

17. The method of claim 16 further comprising notifying the user when the home application or the newly requested home application is not enabled.

18. The method of claim 17 further comprising securing a license for use of the home application or the newly requested home application and updating the user's registration with the authorization server in accordance with each secured license.

19. The method of claim 18 further comprising generating an updated token in accordance with each secured license.

20. The method of claim 19 further comprising receiving a code associated with each secured license into the authorization server to generate the updated token.

\* \* \* \* \*